United States Patent Office
2,971,993
Patented Feb. 14, 1961

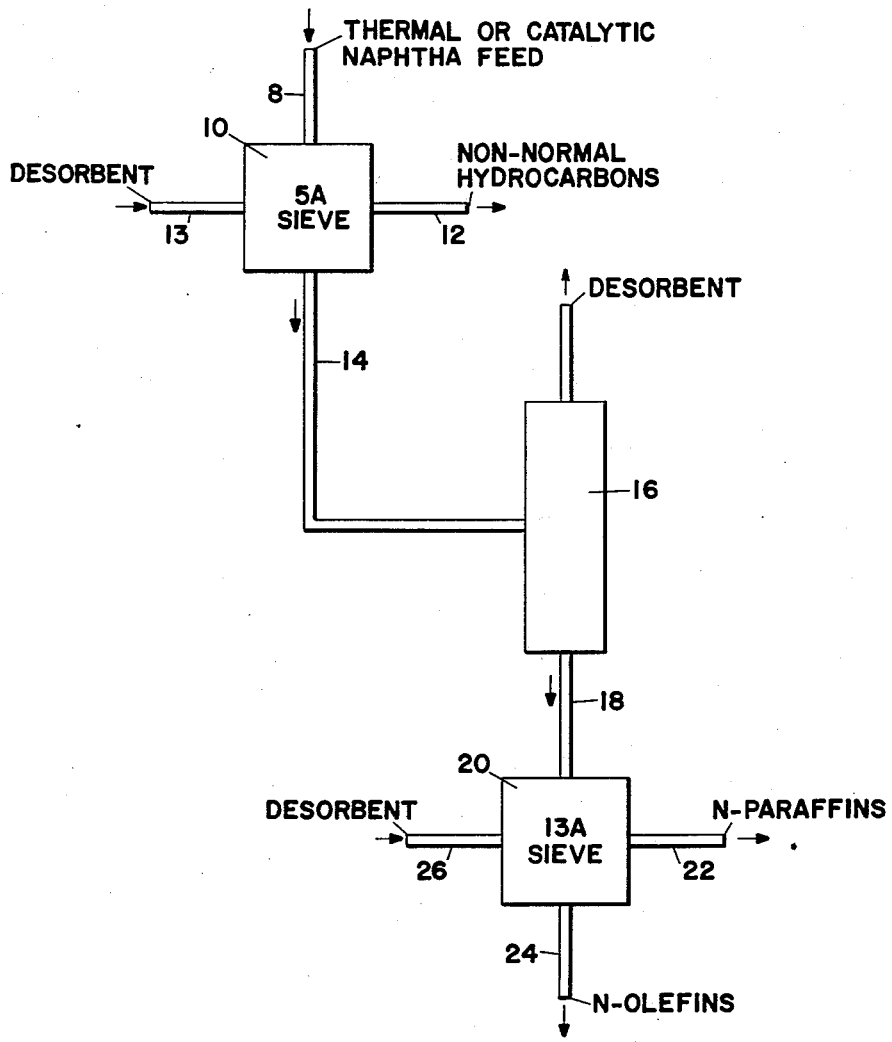

2,971,993

SEPARATION OF OLEFINIC HYDROCARBONS WITH Co, Ba, K, OR Ag SUBSTITUTED 10 TO 13 ANGSTROM MOLECULAR SIEVES

Charles Newton Kimberlin, Jr., and William Judson Mattox, Baton Rouge, La., assignors to Esso Research and Engineering Company, a corporation of Delaware Filed June 4, 1958, Ser. No. 739,903

8 Claims. (Cl. 260—677)

The present invention relates to a process for separating olefins from hydrocarbon streams. More particularly, the present invention relates to the separation of straight chain hydrocarbons, both paraffinic and olefinic, from branch chain and cyclic hydrocarbons employing a class of natural or synthetic adsorbents, termed, because of their crystalline patterns with pore diameters of about 4.5 to 5.5 Angstrom units, molecular sieves. Still more particularly, the present invention relates to the further separation of straight chain olefins from n-paraffins and recovery of these streams in high yields.

It has been known for some time that certain zeolites, both natural and synthetic, have the property of separating straight chain from branch chain hydrocarbon isomers, as well as from cyclic and aromatic compounds. These zeolites have innumerable pores of uniform size, and only molecules small enough to enter the pores can be adsorbed. The pores may vary in diameter from 3 or 4 Angstroms to 15 or more, but it is a property of these zeolites that any particular sieve has pores of a substantial uniform size. For separating n-hydrocarbons from their isomers, the pore size is about 5 Angstroms.

The scientific and patent literature contains numerous references to the sorbing action of natural and synthetic zeolites. Among the natural zeolites having this sieve property may be mentioned chabasites. A synthetic zeolite with molecular sieve properties is described in U.S. 2,442,191. Zeolites vary somewhat in composition, but generally contain the elements of silicon, aluminum and oxygen as well as an alkali and/or an alkaline earth element, e.g., sodium and/or calcium. The naturally occurring zeolite analcite, for instance, has the empirical formula $NaAlSi_2O_6 \cdot H_2O$. Barrer (U.S. 2,306,610) taught that all or part of the sodium is replaceable by calcium to yield, on dehydration, a molecular sieve having the formula $(Ca, Na_2)Al_2Si_4O_{12}$. Black (U.S. 2,522,426) describes a synthetic molecular sieve zeolite having the formula $4CaO \cdot Al_2O_3 \cdot 4SiO_2$. A large number of other naturally occurring zeolites having molecular sieve activity, i.e., the ability to adsorb a straight chain hydrocarbon and exclude the branch chain isomers due to differences in molecular size, are described in an article "Molecular Sieve Action of Solids," appearing in Quarterly Review, vol. III, pages 293–320 (1949), published by the Chemical Society (London). A particularly effective synthetic molecular sieve of high adsorptive capacity may be prepared by heating together sodium aluminate and sodium metasilicate at 180° to 200° F. under carefully controlled conditions to form a sieve having a pore diameter of about 4 Angstroms, and base exchanging the crystalline sodium alumino-silicate formed with calcium ion to form a sieve with pores of about 5 Angstroms diameter.

The segregation or removal of branched chain or straight chain isomers from hydrocarbon mixtures, either for the purpose of enriching the mixture in branched chain components or for isolating and recovering straight chain isomers has become increasingly important in industry with the growing realization that the activity, potency and desired physical property of a product may depend upon the specific structure of the various possible hydrocarbons utilizable as reactants in the preparation or manufacture of the final product. Thus, in the preparation of high octane fuels, the presence of paraffinic straight chain hydrocarbons makes for a lower octane fuel. On the other hand, in the manufacture of synthetic detergents such as the alkyl aryl sulfonates, a straight chain nuclear alkyl substituent confers better detergency characteristics than a branched chain isomer. Numerous other examples might be cited.

It has, in the past, been proposed to make separation of straight chain from branch chain, cyclic and aromatic hydrocarbons by molecular sieves, and excellent and highly selective separations have been realized. However, these separation techniques have proved to be ineffective when applied to streams including both straight chain paraffins and straight chain olefins. Though sieves have preferred adsorption characteristics for highly polar molecules over non-polar ones in mixtures, they will not preferentially adsorb n-paraffins from a stream containing n-paraffins and n-olefins, particularly, when the olefins have more than about 5 carbon atoms in the molecule. Consequently, the sieve, which has a pore size of about 5 Angstroms, will adsorb both the straight chain olefins and paraffins. Desorption of the zeolites will, therefore, produce a product consisting essentially of normal paraffins and normal olefins, still presenting a major separation problem.

It is, therefore, an important aspect of the present invention to set forth a method of separating n-olefins from n-paraffins, as well as iso-olefins and isoparaffins, cyclics, and aromatics, using molecular sieves.

It is a still further purpose of the present invention to produce an olefinic product of high concentration without significant losses due to polymerization or other conversion.

It is a still further object of the present invention to provide a two-stage adsorption process providing a purity and extent of olefin recovery not hitherto realizable.

Other and further objects and advantages of the present invention will appear more clearly in the following more detailed description.

In accordance with the present invention, there is employed a two-stage adsorption process wherein, in the first stage, an olefinic stream, such as a thermal or catalytically cracked naphtha fraction, is first treated with a molecular sieve material of the type previously described, to remove substantially all the straight-chain olefins and paraffins, rejecting the branch chain and alicyclic materials. This straight chain olefinic concentrate is then desorbed from the zeolitic sieve and then readsorbed as a second zeolitic molecular sieve having pore opening of about 10 to 13 Angstrom units. Crystalline zeolites having this size pore opening, as well as those having 4 to 5 Angstrom pore openings, may be synthesized readily from sodium aluminate and sodium silicate, the 10 to 13 Angstrom material containing a somewhat higher proportion of silica in the molecule than the 5 Angstrom material. The 13 Angstrom zeolite has a substantially higher affinity for olefins than it has for paraffins, and sharp separations between these materials is thus possible.

An important element of the present invention is the recovery of these olefins from the zeolites substantially quantitatively. These sieves, being zeolitic, are capable of base exchange. The 10 to 13 Angstrom material has the formula

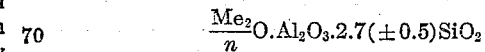

where Me is a metal and $n$ is its valence. It has been found that the amount of olefin that can be recovered from these sieves is dependent to a great extent upon the metallic component of the zeolite. Particularly under vapor phase conditions, certain cations forming part of the 13 Angstrom sieve promote polymerization to such an extent that up to 70 percent of the olefins are converted to polymers. Zinc, manganese and calcium fall in this class. Other cations, such as sodium and magnesium, show this tendency to a much lesser, yet still significant extent. A few cations, among them, divalent cobalt, Ba, K and Ag, however, are substantially free of this polymerizing characteristic, and are thus ideally suited for the olefin recovery process of the present invention.

In one embodiment of the present invention, a mixed branch chain/straight chain material having olefins and paraffins, such as light catalytic naphtha boiling in the $C_6$–200° F. range, may be passed through a bed of molecular sieves having uniform pores of about 5 Angstrom units until normal paraffins appear in the effluent. Thereupon, the sieve bed is desorbed by such process as passing a stream of steam, hot inert gas, or even subjecting the bed to a vacuum until the adsorbed hydrocarbons have been removed. Thereafter, the olefin concentrate is passed to a second bed of crystalline zeolites having pore openings of about 10 to 13 A.U., and preferably having as the metallic component a cation selected from the group of $Co^{++}$, $Ba^{++}$, $K^+$ and $Ag^+$, and recovery from this zone a product not only substantially 100% olefin but representing substantially all the normal olefins in the feed stream.

The process of the present invention may be understood more clearly when read in conjunction with the drawing. Herein there is shown an adsorption column 10 provided with suitable heating means (not shown) and containing the 5 Angstrom molecular sieve adsorbent. An excellent material for this purpose is a synthetic crystalline alumino-silicate prepared by the interaction of sodium aluminate and sodium silicate in amounts such that the ratio of $SiO_2$ to $Al_2O_3$ in solution is in the range of 0.5/1 to 3/1. Heat soaking the precipitate initially formed, at a temperature of about 180° to 212° F. for 1 4 hours results in a highly crystalline zeolite material having a uniform pore opening of 4 Angstroms, and having an empirical formula of $Na_2O.Al_2O_3.2SiO_2$. Base exchanging this material, preferably, with an alkaline earth salt, such as calcium chloride, produces a crystalline zeolite of 5 A.U. pore opening. A more detailed description of a synthesis of this material is found in Example 1.

A motor fuel component prepared by catalytically cracking a hydrocarbon fraction and boiling in the range of about 85° to 425° F. and containing substantial amounts of normal and iso-olefins as well as normal and isoparaffins, naphthenes, and some aromatics is employed as feed in an embodiment of the present invention. A feed of this type, which may contain small amounts of moisture and other impurities, may be initially dried or otherwise purified as by passage over a bed of $Al_2O_3$, preheated to a temperature of about 200° to 400° F., and and passed as a vapor through line 8 into adsorption zone 10 packed with the molecular sieve adsorbent.

The adsorbent, which may be any natural or synthetic zeolite of the type described, may be arranged on trays, or packed on supports, or be unsupported. Within the adsorber reaction conditions include flow rates of 0.1 to 5 v./v./hr., temperatures of 175° to 400° F., and pressures of atmospheric to about 100 p.s.i.g.

The naphtha raffinate now substantially free of straight chain paraffins and straight chain olefins is withdrawn through line 12 and may, with or without further treatment, be employed as a blending stock for high octane motor fuel.

When the sieve becomes saturated with the normal olefins and paraffins, as determined by conventional means such as refractive index or spectrographic analysis of the effluent, the flow of hydrocarbon feed through vessel 10 is halted and is preferably diverted to a second similar unit (not shown) operated in parallel. The desorption cycle then begins.

In one preferred method of desorption the sieve bed is heated to a temperature above that at which adsorption is effected, usually within the range of about 300° to 500° F. A convenient method of heating the sieve adsorbent is by circulation of a preheated desorbent gas or vapor and which may be a portion of the desorbate. However, in the desorption of olefins, especially the higher boiling olefins, a non-olefinic desorbent may be preferred in order to avoid any degradation of olefins during the heating and cooling cycles of the operation. For this service light paraffinic hydrocarbons are a preferred material since they may be separated from the higher boiling liquid paraffins and olefins by means of a simplified distillation. It may also be desirable, especially in the separation of the higher boiling olefins, to carry out the desorption at reduced pressures so as to avoid excessive temperatures. Furthermore, from time to time the sieve may accumulate sufficient polymeric or carbonaceous contaminants to require regeneration, which may be accomplished by controlled burning with a small amount of an oxygen-containing gas such as dilute air.

In addition, it may be desirable to desorb by passing a non-adsorbable fluid, such as isobutane heated to 300° to 500° F., through the adsorption zone 10. This is readily removable from the adsorbate stream by simple flashing in still 16.

Still another method of desorbing the olefin-paraffin product in 10 is to pass steam at a temperature of about 220° to 350° F. into zone 10, within the range of about .7 to 9 pounds per gallon of $C_6$–$C_8$ desorbate. In this case, of course, the desorbent will be taken off as a bottoms fraction rather than an overhead fraction from still 16.

The stream of olefin and paraffin is now passed through line 18 to the second adsorption zone 20, which may be substantially under the same operating conditions as adsorber 10. However, this adsorber is provided with molecular sieves having 10 to 13 Angstrom unit pores, and having perferably as the metallic constituent one of the four cations previously set forth. A good method for synthetically preparing a zeolite of this kind is set forth in Example 2 below. The method is somewhat similar to that employed in preparing the 4 Angstrom material save that the $SiO_2/Al_2O_3$ ratio of the constituents is here in the range of 3/1 to 10/1, and the time necessary to crystallize the precipitate is somewhat longer. The empirical formula of the synthetic zeolite is best expressed by the formula

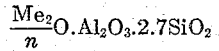

Preferably, the mixed, olefin rich material from adsorber 10 is passed into vessel 20 as a vapor stream and temperatures of 175° to 400° F. are maintained in this zone. Under these conditions, olefins are substantially adsorbed while paraffins, though they may in part be initially adsorbed, are relatively rapidly displaced by olefins. As a result, a substantially pure normal paraffin stream may be withdrawn through line 22, and this may advantageously be passed to an isomerization process for conversion to high octane product. Thereafter, when olefins appear in this effluent, zone 20 is desorbed in a manner already described for zone 10, and an olefin stream of high purity is recovered with substantially no losses due to polymerization, condensation, or other secondary reaction product formation.

The process of the present invention may be further illustrated by the specific examples below:

EXAMPLE 1

The 5 Angstrom zeolite may be advantageously synthesized as below:

Three hundred fourteen (314) grams of sodium metasilicate (1.5 mols $Na_2O$; 1.5 mols $SiO_2$) was dissolved in 945 cc. of water. To this solution there was added with good stirring and mixing 510 grams of sodium aluminate solution which had a specific gravity of 1.44 and comprised 1.5 mols $Na_2O$ and 1.0 mols $Al_2O_3$. An additional 500 cc. of water was added to facilitate stirring. The mixture was heat soaked at 180° to 212° F. for 3 hours to promote growth of 4 Angstrom crystals, whereafter it was filtered, washed, dried, converted to the Ca-form by base exchange with $CaCl_2$ solution, and calcined at a final temperature of 850° F. for 2 hours. This material had an adsorptive capacity of 0.18 cc. of normal heptane per gram of sieve.

EXAMPLE 2

The 10–13 Angstrom zeolite, used in the second stage, may be advantageously synthesized by the same general procedure as employed in Example 1 for the 5A type sieve except for a greater proportion of sodium metasilicate to increase the ratio of $SiO_2/Al_2O_3$ to about 4/1. Heating the mixture to 210° F. for 7 hours will effect crystallization. The crystalline product resulting from the heat-treating step, after filtering and working, may be converted to the potassium form sieve by base exchange with KCl solution. A solution of 100 gms. of KCl in 300 cc. of water is adequate to treat 150 to 200 gms. of sieve, although two portions of the KCl solution may be used, with intermediate water washing, to remove essentially all of the replaceable sodium. Calcination of the water washed, K-exchanged sieve at a final temperature of about 850° F. for 2 hours completes the preparation.

EXAMPLE 3

The necessity of employing the two stage adsorption process of the present invention is demonstrated in this example, wherein it is shown that adsorption by a 5A sieve of a catalytic naphtha stream results in a product, after desorption, which is an olefin concentrate but which still contains substantial amounts of normal paraffins.

*5A sieve concentration of n-olefins and paraffins*

A $C_6$ to $C_7$ catalytic naphtha fraction having an API gravity of 65.7 and a bromine number of 101 was vaporized and fed to a fixed-bed column of 5A sieves maintained at 240° F. This feed contained 55% total olefins, 39% paraffins, and 6% aromatics. After 66 vols. of unadsorbed effluent had been collected per 100 vols. of sieve, straight-chain hydrocarbons appeared in the effluent. At 70 vols. of effluent/100 vols. of sieve, feed to the sieve bed was discontinued. The adsorbed, straight-chain olefin-paraffin fraction was recovered by steam desorption and amounted to 11.5 vol. percent of the $C_6$ to $C_7$ feed. This concentrate contained 73% n-olefins and 27% n-paraffins.

In a similar adsorption with the same feed and a fresh bed of 5A sieve, 141 vols. of effluent/100 vols. of sieve were collected before recovery of the adsorbed, straight chain fraction by steam desorption. Due to the larger volume of feed used in this test, the yield of n-olefin-n-paraffin fraction amounted to only 6.2 vol. percent of the $C_6$ to $C_7$ naphtha. This olefin concentrate contained 60% olefins and 40% paraffins. This lowered concentration of n-olefins of 60% as compared to 73% in the first test results from the inability of the n-$C_6$ olefin to displace n-$C_7$ paraffin and, at the higher proportion of feed, some of the n-$C_6$ olefin was displaced with n-heptane.

EXAMPLE 4

A $C_6$ to $C_7$ olefin feed similar to the above n-olefin-n-paraffin concentrate recovered from the 5A sieve was vaporized and fed to a fixed-bed of potassium-form 13A sieve at 240° F. After 10 volumes of effluent/100 volumes of sieve had been collected, the feed was interrupted and the adsorbent steamed to recover adsorbate. The olefin content of the adsorbate was 100%.

EXAMPLE 5

*Comparison of metal exchanged 13A sieves*

For the separation of paraffins from olefins in the second stage, cobalt, barium, potassium, or silver exchanged 13A type will usually be preferred since the use of these metal exchanged forms result in less loss of olefinicity due to catalytic effects than results from the use of the sodium or several other metal forms. A comparison of changes in the olefinicity of a $C_6$ to $C_7$ catalytic naphtha fraction on contact with various metal forms of 13A sieve is shown in the following tabulation.

COMPARISON OF METAL EXCHANGED 13A SIEVES FOR CATALYTIC NAPHTHA TREATING

[Pressure, ATM.; temp., 240° F.]

| Test No. | Metal Exchanged 13A Sieve | Total Recovery, Wt. Percent | Conversion of Olefin, Percent |
|---|---|---|---|
| 510 | $Co^{++}$ | 98.7 | 0 |
| 514 | Ba | 100.5 | 0 |
| 520 | K | 100.0 | 0 |
| 519 | Ag | 97.9 | 3 |
| 503 | Na | 97.0 | 11 |
| 515 | Li | 98.2 | 15 |
| 506 | Mg | 96.7 | 21 |
| 511 | $Pb^{++}$ | 93.8 | 21 |
| 509 | $Cu^{++}$ | 94.3 | 25 |
| 522 | $Ni^{++}$ | 96.7 | 25 |
| 516 | Cd | 95.6 | 27 |
| 512 | $Fe^{++}$ | 93.7 | 32 |
| 517 | Sr | 95.0 | 48 |
| 521 | H | 94.8 | 49 |
| 518 | $Hg^{++}$ | 78.5 | 52 |
| 524 | $Co(NH_4)_4^{++}$ | 92.5 | 57 |
| 505 | Zn | 89.3 | 62 |
| 513 | $Mn^{++}$ | 93.9 | 62 |
| 504 | Ca | 92.0 | 70 |

These data clearly show that the $Ba^{++}$, $K^+$ and $Co^{++}$ forms of the 13A zeolite cause no olefin conversion, and the $Ag^+$ form only a 3% conversion. These forms, accordingly, are the preferred adsorbents in olefin separation and concentration operations since they enable complete olefin recovery to be obtained and the sieve maintained at full capacity in the absence of accumulation of polymeric materials in the adsorbate. Polymer deposition requires frequent interruption for sieve regeneration by steaming, burning, or other thermal means, and this makes the process less efficient.

The process of the present invention may be modified in many respects and still be within the scope thereof. Thus olefins may be separated from the products of catalytic dehydrogenation, thermal or catalytic cracking reactions, etc., with recycle of unconverted paraffinic hydrocarbons. The separation may be employed for substantially any feed containing olefins. The olefins recovered by the process may be employed as alkylating agents or in the synthesis of chemicals. Though a fixed-bed operation has been described, the separation cycles may also be carried out by means of a moving-bed or the so-called fluidized solids technique in fluidized beds. The process of the present invention is particularly adapted to be employed in association with various means for upgrading virgin and cracked naphthas to form high octane motor fuels. The process is advantageously employed in connection with a fluid or fixed-bed reforming operation wherein naphthas are treated at elevated temperatures and pressures in the presence of a catalyst containing platinum, molybdena, chromia, etc., under conditions to convert a substantial portion of the hydrocarbons present to aromatics and olefins. The resulting reformate is then enhanced in octane value by removal of n-paraffins and n-olefins by the sieves. The adsorbate may then be recovered in accordance with the process of the present invention and recycled to the hydroformer for further conversion. Furthermore, instead of steam desorption, olefins may be desorbed by purging at elevated temperatures or evacuation at lower temperatures.

As previously pointed out, it is an important objective of the present invention to produce an olefinic product of high concentration without significant losses due to polymerization or other conversion. An important non-olefinic diluent in olefin streams sometimes is aromatics and it is normally very difficult to separate aromatics from olefins without converting one or the other. However, in accordance with the present invention this separation can be particularly effectively carried out with the preferred metallo-crystalline alumino-silicates hitherto described and in particular with the barium zeolite. In this embodiment of the present invention, olefinic streams contaminated with aromatics may be passed to such an alumino-silicate adsorption zone wherein the crystalline zeolites have pore openings between 10 and 13 Angstrom units and an olefinic desorbate containing extremely small amounts of aromatics is recovered. This embodiment is demonstrated in Example 6.

EXAMPLE 6

A light catalytic naphtha fraction having a boiling range of 150° to 200° F. and comprising 6% aromatics, 39% saturates, and 55% normal, iso-, and cyclic olefins was treated in vapor phase at 240° F., with the preferred $Co^{++}$, Ba, K, and Ag forms of 13A sieve to effect adsorption of the olefinic and/or aromatic components. The following tabulation shows the composition of the adsorbates recovered by steaming the adsorbent.

SEPARATION OF AROMATICS FROM LIGHT CATALYTIC NAPHTHA WITH METAL EXCHANGED 13A SIEVES

[Pressure, atm.; temp., 240° F.]

| Metal Exchanged 13A Sieve | Adsorbate | | | | Olefin Conversion, Percent |
|---|---|---|---|---|---|
| | Yield, Wt. Percent | Composition, Percent | | | |
| | | Olefins | Paraffins | Aromatics | |
| Ba | 25.5 | 99 | 0 | 1 | 0 |
| K | 37.0 | 91 | 0 | 9 | 0 |
| Ag | 25.8 | 88 | 0 | 12 | 3 |
| $Co^{++}$ | 25.2 | 85 | 0 | 15 | 0 |

In this embodiment the total olefins in the feed, i.e. normal, iso-, and cyclic, are recovered. Should it be desirable to segregate the normals then the two-stage process previously described is employed.

In the above example the barium zeolite is employed. However, the potassium, silver and cobaltous forms may be used to produce aromatic-free olefin concentrates by employing multiple sieve beds in series, the first of which preferentially retains aromatics. On break-through of aromatics this vessel is segregated and desorbed for return to further service, either as the initial or as a subsequent adsorption zone.

What is claimed is:
1. An improved process for concentrating olefins from olefin-containing streams which comprises passing a vaporized stream containing olefinic and non-olefinic constituents through a molecular sieve adsorption zone, maintaining in said zone a catalytically inert crystalline zeolitic molecular sieve having uniform pore openings of from 10 to 13 Angstrom units, said molecular sieve having the formula

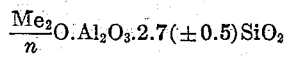

where Me is a metal selected from the class consisting of divalent cobalt, barium, potassium and silver, and $n$ is its valence, withdrawing unadsorbed hydrocarbon constituents from said zone, thereafter desorbing said zone and recovering a high purity olefin concentrate.

2. The process of claim 1 wherein said metal is barium.
3. The process of claim 1 wherein said vaporized stream comprises aromatics and said recovered product is substantially free of aromatics.
4. An improved process for separating straight chain olefins from mixtures containing straight chain paraffins which comprises passing a vaporized stream of hydrocarbons comprising n-paraffins and n-olefins into a 5 Angstrom zeolitic molecular sieve adsorption zone, withdrawing unadsorbed hydrocarbons from said zone, while adsorbing normal paraffins and olefins, thereafter desorbing said zone, recovering a concentrate of normal paraffins and olefins, passing a vaporized stream of said concentrate through a second molecular sieve adsorption zone, maintaining in said zone a catalytically inert crystalline zeolitic molecular sieve having uniform pore openings of from 10 to 13 Angstrom units, said molecular sieve having the formula

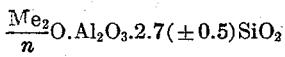

where Me is a metal selected from the class consisting of divalent cobalt, barium, potassium and silver, and $n$ is its valence, withdrawing unadsorbed normal paraffins from said zone, thereafter desorbing said zone and recovering a high purity normal olefin product.

5. The process of claim 4 wherein said initial vaporized stream is a naphtha fraction boiling in the gasoline range.
6. The process of claim 4 wherein adsorption temperatures are in the range of from about 175° to about 400° F.
7. The process of claim 4 wherein said normal hydrocarbon stream is passed to an isomerization zone.
8. The process of claim 4 wherein said normal hydrocarbon stream is passed to an aromatization zone.

References Cited in the file of this patent
UNITED STATES PATENTS

| | | |
|---|---|---|
| 2,818,449 | Christensen et al. | Dec. 31, 1957 |
| 2,834,429 | Kinsella et al. | May 13, 1958 |
| 2,882,244 | Milton | Apr. 14, 1959 |

OTHER REFERENCES

Chemical and Engineering News, vol. 32, p. 4786, Nov. 1954.

Linde Co., Form 9447, "Molecular Sieves," published Aug. 19, 1957, (2 pp.).